United States Patent [19]

Nakamura et al.

[11] Patent Number: 4,788,065

[45] Date of Patent: Nov. 29, 1988

[54] FEEDING METHOD IN BREEDING SOWS

[75] Inventors: Kimiyoshi Nakamura; Takashi Nakaoyama, both of Ibaraki; Toshiaki Eida; Hidemasa Hidaka, both of Kanagawa, all of Japan

[73] Assignees: National Federation of Agricultural Co-operative Associations; Meiji Seika Kaisha, Ltd., both of Tokyo, Japan

[21] Appl. No.: 43,011

[22] Filed: Apr. 27, 1987

[30] Foreign Application Priority Data

Jul. 7, 1986 [JP] Japan .................. 61-160341

[51] Int. Cl.$^4$ .................................... A23K 1/00
[52] U.S. Cl. ............................ 426/2; 426/658
[58] Field of Search ............ 426/2, 658, 804, 807

[56] References Cited

U.S. PATENT DOCUMENTS 4,681,771 7/1987 Adachi et al. ................ 426/804 X

FOREIGN PATENT DOCUMENTS 0133547 2/1985 European Pat. Off. .

Primary Examiner—R. B. Penland
Attorney, Agent, or Firm—Frank J. Jordan; C. Bruce Hamburg; Manabu Kanesaka

[57] ABSTRACT

New animal diet designed for breeding sows contains, as an essential ingredient, a sugar composition that is mainly fructo-oligosaccharides, mixed at 0.1 to 5% level with regular feed. Above diet has effective roles to short days to estrus after weaning of sows, thereby increasing the numbers of piglets at low cost and less labor is expected as a result. The sugar composition is obtained through the enzymatic process of fructose transferase upon sucrose in order to produce fructo-oligosaccharide as a main component.

2 Claims, No Drawings

FEEDING METHOD IN BREEDING SOWS

FILED OF THE INVENTION

This invention is regarding to specially formulated animal diet affecting the interval from weaning to first estrus in sows. The diet developed here is characterized by the composition of sugars in it. Fructo-oligosaccharides is a gain component of sugars which is found in this invention to be effective on the returning to the estrus in sows after weaning.

DESCRIPTION OF THE PREVIOUS ART

The consumption of meat is increasing every year as a result from changing of eating habits in Japan. Under such circumstances, various attempts have been made to improve the productivity in the livestock industry to adapt to the various demands in the market.

According to the "Livestock Statistics" from the Ministry of Agriculture, Forestry and Fishery in Japan, the number of pig farmers in 1983 has decreased to 100,000 from 220,000 in 1975. The total number of pigs, on the other hand, was 10,270,000 head in 1983 and 7,680,000 head in 1975.—These statistics show that the total number of pigs increases to 1.34 times even though the number of breeders decreased to less than a half. Differently, although it was shown that the majority of farmers raising less than 100 pigs in 1975, the proportion of small farms similar to them in 1983 decreased below a half of 1975. While, the number of farmers raising 300–1,000 or more have increased. In 1975, it was only 32% of total number of farms have raised more than 300 pigs, however, this rate increased to 55% in 1983. It is obvious that the management of breeding sows has been improved and more concentrated, and this type of managements appear to be continued in years to come. In the pig business, however, increasing number of piglets per sow per year still might be considered as one of the most important subjects.

What come to mind at first when one attempts to enhance swine reproduction efficiency would be to increase the number of piglets in each litter, to enhance the survival rate of newborns, and to increase the parturition frequency of each sow. Of these, increasing the parturition frequency is all-important to achieve higher productivity. To this end, it is desired that the estrus resumption days after each weaning be reduced as much as possible to allow as early mating as possible.

The number of piglets born per litter and the survival rate of piglets have been improved by incorporating of new breeding technologics and the improvement of raising facilities and sanitary conditions. It is still remained as a critical concern that is to short the interval from weaning to estrus. For example, it has recently been tried to decrease the lactation period from ordinary 30 days or more to about 20 days in order to increase the number of parturitions. Such a reduction of lactation period, however, tends to delay the first estrus after weaning and failed to contribute to increase the frequency of parturitions per sow per year.

Many attempts have been made to get post-weaning estrus immediately. Active sunbathing and exercise after weaning or raising in group with boars are helpful to restore normal physical conditions. Providing artificially regulated environment is worth in summer when estrus seems to be delayed. Proper nourishment can prevent excessively high or low body weight; and injection of hormone-like drugs can promote to induce the immediate estrus after weaning.

Any of these conventional methods, however, is not absolutely satisfactory. The methods based on nourishment generally need much labor and leave many difficulties even in the recent intensive breeding systems. The effects are not so conspicuous. The method of immediate induction of estrus by drug administration requires costs and labor, and the drugs usually show side effects and are difficult to handle.

DESCRIPTION OF THE INVENTION

The object of this invention is to provide new animal diet at low cost and labor for breeding sows, which is capable of shortening days to the estrus after weaning with no adverse effect, and is to provide a method to increase the numbers of piglets by inducing the estrus immediately.

This object can be achievedby the animal diet of this invention containing a sugar composition which is mainly fructo-oligosaccharides.

The fructo-oligosaccharide composition used in this invention is, for example, a composition obtained by the action of a fructose transferase upon sucrose, which is a mixture of fructo-oligosaccharides consisting of one to three fructose units linked to a sucrose molecule, with sucrose, glucose and fructose [refer to Japanese Patent Kokai No. 154967 (1981)]. A manufacturing example of this sugar composition is described below.

MANUFACTURING EXAMPLE

BS medium containing 5.0% sucrose, 1.0% peptone, 0.7% boullion and 0.3% sodium chloride was placed in two test tubes (10 ml each) and sterilized at 120° C. for 30 minutes. One A"ze-ful sample of *Aspergillus niger* (The genus Aspergillus, Williams & Wilkins Corporation, 1965, Item 293) was inoculated to each test tube and incubated at 28° C. for 24 hours. The culture thus obtained was then inoculated to two conical flasks each containing 200 ml of BS medium previously sterilized at 120° C. for 30 minutes (10 ml of culture to each), and subjected to shake culture at 28° C. for 24 hours, giving a master culture.

Twenty liters of BS medium was charged in a 30-liter jar fermentor, sterilized at 120° C. for 30 minutes and, cooled. The master culture prepared above (a total of 400 ml) was inoculated to this medium, and cultivated at 28° C. for 72 hours with aeration and agitation (300 rpm). At the end of cultivation, microbial cells were filtered off, and 20 liters of the filtrate was concentrated and purified by ultrafiltration, giving 2 liters of an enzyme solution (enzyme activity: 240 unit/ml).

Separately, 10 Kg of sucrose was dissolved in 6.7 liters of water, and the pH of the resulting solution was adjusted to 5.0. To this solution was added the enzyme solution prepared above in an amount of 48 units per gram of sucrose and the mixture was held at 50° C. for 48 hours to complete transformation. At the end of reaction, the mixture was heated at 100° C. for 15 minutes to deactivate the enzyme, and decolorized by addition of activated charcoal (0.5% on solid base). After removal of the charcoal, the filtrate was treated with ion-exchange resins (Amberlite IR120B and Amberlite IRA411) and then concentrated, affording 12 Kg of a sugar composition consisting of 33% glucose (G), 2% fructose (F), 10% sucrose (GF), 25% 1-kestose (GF2), 25% nistose (GF3) and 5% fructosylnistose (GF4).

The animal diet for breeding sows in this invention (the first aspect of the invention) contains, as essential ingredient, a fructo-oligosaccharide composition which can be obtained by a method as described above. The suitable amount of the fructo-oligosaccharide composition to be added is determined by both effect on the shortening days to estrus and economic factors. The optimal range is varied though, 0.1 to 5% based on the weight of the total feed is preferable.

Pig farmers generally isolate pregnant sows to a separate barn approximately seven days prior to parturition. The method of feeding sows in this invention (the second aspect of the invention) is to give the above-specified diet during the period from isolation to weaning.

As stated above, the animal diet in this invention is preferably given to pregnant sows starting seven days before the expected parturition and to weaning. The suitable daily amount is 1.8 to 3.0 Kg/head before parturition, and the amount is appropriately increased after parturition depending on the number of newborns.

EXAMPLES

Example 1

Twenty pregnant sows (seven days before the expected parturition) were evenly divided into control and experimental groups, and were tested throughout the period of parturition, lactation (21 days), weaning and estrus. A commercial sow diet was given to the control animals, while the sows of experimental group received the diet in this invention which consists of 100 parts by weight of the commercial diet supplemental with 0.375 part of the fructo-oligosaccharide composition obtained through previously described manufacturing process.

Diets were fed 2.0 Kg/day before parturition (no feeding on the day of parturition). After parturition, the amount was additionally increased by 1 Kg/day. From the 4th or 5th day to 19th day of lactation, however, 2 Kg/sow and 0.4 Kg/piglet were given daily. Finally, 2 Kg was given on the 20th day and no diet was give on the 21th (weaning) day.

Number of days required to estrus after weaning and number of piglets per litter are summarized in Table 1 and 2.

TABLE 1

| | Effect of fructo-oligosaccharide on days from weaning to estrus in sows | | |
|---|---|---|---|
| Diet | 14 Days or shorter (No. of sows) | 15 Days or longer (No. of sows) | Average days to estrus |
| Experimental* | 7 | 3 | 11.6 |
| Cotrol | 3 | 7 | 20.0 |

*0.375% fructo-oligosaccharide composition added

TABLE 2

| | Effect of fructo-oligosaccharide of litter size | |
|---|---|---|
| Diet | No. of piglets born | No. of piglets weaned |
| Experimental* | 8.5 ± 3.1 | 7.5 ± 2.9 |
| Control | 8.3 ± 2.6 | 7.2 ± 2.6 |

*0.375% fructo-oligosaccharide composition added

Example 2

Twenty pregnant sows were examined in the same manner as in Example 1 except for 0.375 part was replaced by 0.75 part of the fructo-oligosaccharide composition in the experimental diet. Results are summarized in Table 3 and 4.

TABLE 3

| | Effect of fructo-oligosaccharide on days from weaning to estrus in sows | | |
|---|---|---|---|
| Diet | 14 Days or shorter (No. of sows) | 15 Days or longer (No. of sows) | Average days to estrus |
| Experimental* | 5 | 5 | 14 |
| Control | 3 | 7 | 18 |

*0.75% fructo-oligosaccharide composition added

TABLE 4

| | Effect of fructo-oligosaccharide on litter size | |
|---|---|---|
| Diet | No. of piglets born | No. of piglets weaned |
| Experimental* | 8.7 ± 3.9 | 7.3 ± 3.1 |
| Control | 9.5 ± 3.7 | 6.3 ± 1.9 |

*0.75% fructo-oligosaccharide composition added

The effect is apparent, in that days from weaning to estrus can be shortened if a fructo-oligosaccharide is added to an animal diet for breeding sows when the diet supplemental fructo-oligosaccharide is given to sow from seven days before parturition to weaning.

The expected economic roles from this invention is described below.

In this estimation, it is assumed that each litter has nine piglets, the lactation period is 30 days, and each sow becomes pregnant after one pairing. The full reproductive cycle in the control group (no fructo-oligosaccharide composition added) is 115 days for pregnancy, 30 lactating days to weaning and 20 days to first estrus (a total of 165 days). Thus, the parturition occurs 2.21 times per year.

In the experimental group, the sows received the animal diet supplemental with fructo-oligosaccharide composition of this invention, only 11.6 days are needed to estrus, and the whole reproductive cycle comprises a total of 156.6 days. It is 8.4 days shorter compared to the control group. This shortened cycle gives a parturition frequency of 2.33 times per year (up 0.12 times compared to the control group). The number of piglets per sow per year increases 1.08 head (=9×0.12). The nearly production of piglets would be increasing 108 if a farmer is raising 100 sows, and 540 per 500 sows. This provides significant benefits to pig farmers.

What is claimed on this invention is:

1. A method of reducing an interval from weaning to estrus in sows comprising feeding to sows a saw animal diet containing an effective amount of sugar composed mainly of fructooligosaccharides for a period of time after pregnant sows are separated from other pigs for parturition until weaning.

2. A method according to claim 1, wherein said sugar composed mainly of fructooligosaccharides is added to the animal diet at 0.1 to 5% by weight relative to the total weight of the animal diet.

* * * * *